(12) United States Patent
Hong et al.

(10) Patent No.: US 11,713,712 B2
(45) Date of Patent: Aug. 1, 2023

(54) VEHICLE AND CONTROL METHOD FOR GENERATING COMPRESSED AIR BY MOTOR

(71) Applicants: Hyundai Motor Company, Seoul (KR); Kia Corporation, Seoul (KR)

(72) Inventors: Dongwoo Hong, Gyeonggi do (KR); Chae Mo Yang, Gyeonggi do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 52 days.

(21) Appl. No.: 17/531,974

(22) Filed: Nov. 22, 2021

(65) Prior Publication Data

US 2022/0252001 A1  Aug. 11, 2022

(30) Foreign Application Priority Data

Feb. 9, 2021 (KR) .......................... 10-2021-0018339

(51) Int. Cl.
| | |
|---|---|
| *F02B 65/00* | (2006.01) |
| *B60W 20/00* | (2016.01) |
| *F02M 26/14* | (2016.01) |
| *B60K 6/24* | (2007.10) |
| *F02D 41/00* | (2006.01) |

(Continued)

(52) U.S. Cl.
CPC .............. *F02B 65/00* (2013.01); *B60K 6/24* (2013.01); *B60W 10/06* (2013.01); *B60W 10/08* (2013.01); *B60W 20/00* (2013.01); *B60W 30/18054* (2013.01); *F02D 41/0047* (2013.01); *F02M 26/14* (2016.02); *B60K 6/20* (2013.01); *B60S 1/00* (2013.01); *B60S 5/04* (2013.01); *B60W 2710/0683* (2013.01); *B60Y 2200/92* (2013.01)

(58) Field of Classification Search
CPC ..... B60K 6/20; B60K 6/24; B60S 1/00; B60S 5/04; B60W 10/06; B60W 10/08; B60W 20/00; B60W 30/18054; B60W 2710/0683; B60Y 2200/92; F02B 65/00; F02D 41/0047; F02M 26/14
See application file for complete search history.

(56) References Cited

U.S. PATENT DOCUMENTS

| | | | |
|---|---|---|---|
| 10,690,066 B2 * | 6/2020 | Dudar ..................... | B60C 23/14 |
| 10,774,725 B2 * | 9/2020 | Dudar ..................... | F02B 39/10 |

(Continued)

FOREIGN PATENT DOCUMENTS

EP         3176020 A1 *  6/2017

*Primary Examiner* — Hung Q Nguyen
*Assistant Examiner* — Mark L. Greene
(74) *Attorney, Agent, or Firm* — Fox Rothschild LLP (57) ABSTRACT

A vehicle and a control method are capable of generating compressed air using a motor of a hybrid vehicle so as to perform cleaning/care of the hybrid vehicle, without an additional or separate device. The vehicle includes an engine including an intake pipe provided to suck outside air and an exhaust pipe provided to discharge inside air, an opening degree control valve provided at a rear end of the exhaust pipe, and a motor configured to generate power for driving a wheel and configured to drive a piston of the engine by using a portion of the power. In response to the opening degree control valve being in a closed state, and in response to the engine being in a non-combustion state, compressed air is generated in the exhaust pipe by driving the piston of the engine with the power of the motor.

14 Claims, 6 Drawing Sheets

(51) Int. Cl.
     *B60W 10/06*     (2006.01)
     *B60W 10/08*     (2006.01)
     *B60W 30/18*     (2012.01)
     *B60S 1/00*     (2006.01)
     *B60K 6/20*     (2007.10)
     *B60S 5/04*     (2006.01)

(56)     References Cited

U.S. PATENT DOCUMENTS

| | | | |
|---|---|---|---|
| 11,572,830 B2 * | 2/2023 | Martin | F02D 41/0087 |
| 2006/0137345 A1 * | 6/2006 | Cho | F02M 35/10157 60/605.1 |

* cited by examiner

VEHICLE AND CONTROL METHOD FOR GENERATING COMPRESSED AIR BY MOTOR

CROSS-REFERENCE TO RELATED APPLICATION(S)

This application claims under 35 U.S.C. § 119 the benefit of Korean Patent Application No. 10-2021-0018339, filed on Feb. 9, 2021 in the Korean Intellectual Property Office, the entire contents of which are incorporated by reference herein.

BACKGROUND

1. Technical Field

The disclosure relates to a vehicle, more particularly, to the vehicle that is a hybrid vehicle including an engine and a motor in which the motor is configured to generate compressed air for cleaning/care of the vehicle.

2. Description of Related Art

A vehicle is increasingly being used as a living space in addition to a form of transportation, and thus people are interested in maintaining the interior of the vehicle in a tidy condition. Accordingly, there is a growing need of a product useful for vehicle care such as a car vacuum cleaner. Further, due to the trend of vehicle weight reduction, a greater number of vehicles include a tire kit for repairing a flat tire, instead of a spare tire. In addition, for tire care, people may purchase a tire air compressor for managing air pressure of tires of the vehicle.

In order to use such existing vehicle care products, it is typically necessary to purchase separate products, which may be expensive and inconvenient. In addition, there are inconveniences such as the need for an external power source and a separate loading space.

SUMMARY

Therefore, it is an aspect of the disclosure to provide a hybrid vehicle and a control method thereof, the hybrid vehicle being capable of generating compressed air using a motor so as to perform cleaning/care of the hybrid vehicle. As provided herein, the hybrid vehicle can be a hybrid electrical vehicle (HEV) or a plug-in hybrid electrical vehicle (PHEV). According to the disclosure, the compressed air can be generated without an additional device, thus increasing user convenience and reducing cost.

Additional aspects of the disclosure will be set forth in part in the description which follows and, in part, will be obvious from the description, or may be learned by practice of the disclosure.

In accordance with an aspect of the disclosure, a vehicle includes an engine including an intake pipe provided to suck outside air and an exhaust pipe provided to discharge inside air, an opening degree control valve provided at a rear end of the exhaust pipe, and a motor configured to generate power for driving a wheel and configured to drive a piston of the engine by using a portion of the power. In response to the opening degree control valve being in a closed state, and in response to the engine being in a non-combustion state, compressed air is generated in the exhaust pipe by driving the piston of the engine with the power of the motor.

The vehicle may further include a compressed air outlet provided on a first side of the exhaust pipe and through which internal air of the exhaust pipe is discharged to an outside.

The vehicle may further include a pressure adjusting device provided on a second side of the exhaust pipe to adjust an internal pressure of the exhaust pipe.

The compressed air outlet may be configured to allow an air blow gun to be connected thereto.

The vehicle may further include an exhaust gas recirculation (EGR) device provided between the exhaust pipe and the intake pipe of the engine, an exhaust side connecting pipe provided to connect the EGR device to the exhaust pipe, and a compressed air outlet provided on one side of the exhaust side connecting pipe and through which internal air of the exhaust pipe is discharged to an outside.

The EGR device may include a recirculation control valve, and a pressure of the internal air of the exhaust pipe may be regulated through the recirculation control valve.

The compressed air outlet may be configured to allow an air blow gun to be connected thereto.

In accordance with another aspect of the disclosure, a control method of a vehicle including an engine including an intake pipe provided to suck outside air and an exhaust pipe provided to discharge inside air; an opening degree control valve provided at a rear end of the exhaust pipe; and a motor configured to generate power for driving a wheel and configured to drive a piston of the engine by using a portion of the power, the control method includes, in response to the opening degree control valve being in a closed state, and in response to the engine being in a non-combustion state, generating compressed air in the exhaust pipe by driving the piston of the engine with the power of the motor.

The control method may further include a compressed air outlet provided on a first side of the exhaust pipe and through which internal air of the exhaust pipe is discharged to an outside.

The control method may further include a pressure adjusting device provided on a second side of the exhaust pipe to adjust an internal pressure of the exhaust pipe.

The compressed air outlet may be configured to allow an air blow gun to be connected thereto.

The control method may further include an exhaust gas recirculation (EGR) device provided between the exhaust pipe and the intake pipe of the engine, an exhaust side connecting pipe provided to connect the EGR device to the exhaust pipe, and a compressed air outlet provided on one side of the exhaust side connecting pipe and through which internal air of the exhaust pipe is discharged to an outside.

The EGR device may include a recirculation control valve, and a pressure of the internal air of the exhaust pipe may be regulated through the recirculation control valve.

The compressed air outlet may be configured to allow an air blow gun to be connected thereto.

In accordance with another aspect of the disclosure, a vehicle includes an engine including an intake pipe provided to suck outside air and an exhaust pipe provided to discharge inside air, an opening degree control valve provided at a rear end of the exhaust pipe, a compressed air outlet provided on a first side of the exhaust pipe and through which internal air of the exhaust pipe is discharged to an outside, and a motor configured to generate power for driving a wheel and configured to drive a piston of the engine by using a portion of the power. In response to the opening degree control valve being in a closed state, and in response to the engine being in a non-combustion state, compressed air is generated in the exhaust pipe by driving the piston of the engine with the power of the motor, and the compressed air outlet may be configured to allow an air blow gun to be connected thereto.

In accordance with another aspect of the disclosure, a vehicle includes an engine including an intake pipe provided to suck outside air and an exhaust pipe provided to discharge inside air, an opening degree control valve provided at a rear end of the exhaust pipe, an exhaust gas recirculation (EGR) device provided between the exhaust pipe and the intake pipe of the engine, an exhaust side connecting pipe provided to connect the EGR device to the exhaust pipe, a compressed air outlet provided on one side of the exhaust side connecting pipe and through which internal air of the exhaust pipe is discharged to an outside, and a motor configured to generate power for driving a wheel and configured to drive a piston of the engine by using a portion of the power. In response to the opening degree control valve being in a closed state, and in response to the engine being in a non-combustion state, compressed air is generated in the exhaust pipe by driving the piston of the engine with the power of the motor.

The EGR device may include a recirculation control valve, and a pressure of the internal air of the exhaust pipe may be regulated through the recirculation control valve.

The compressed air outlet may be configured to allow an air blow gun to be connected thereto.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the disclosure.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
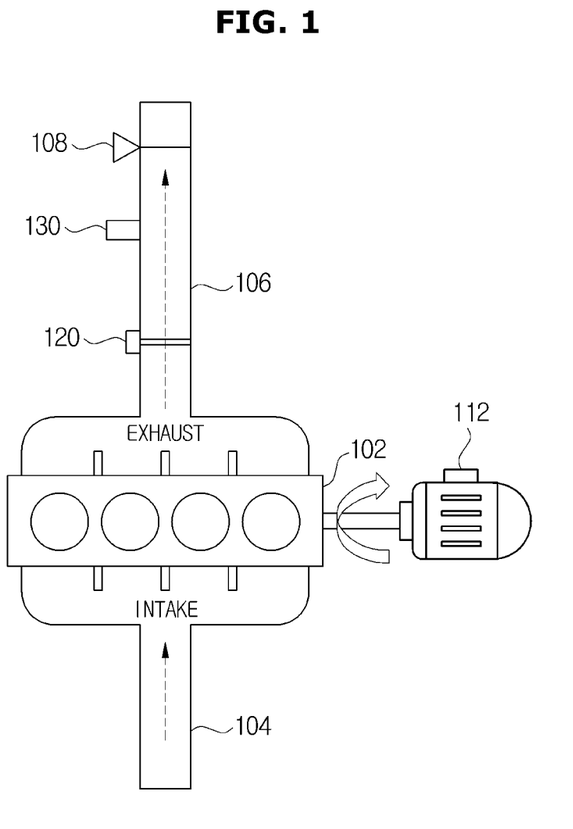
FIG. 1 is a view illustrating a vehicle according to an embodiment of the disclosure.

FIG. 1 is a view illustrating a vehicle according to an embodiment of the disclosure. Particularly, FIG. 1 is a view illustrating a vehicle in which an exhaust gas recirculation (EGR) device is not provided in an engine 102. The vehicle of FIG. 1 is a hybrid electric vehicle (HEV) or a plug-in hybrid electric vehicle (PHEV) including the engine 102 and an electric motor 112. Accordingly, the vehicle of FIG. 1 may receive power from either the engine 102 or the electric motor 112, or both the engine 102 and the electric motor 112.

In FIG. 1, a piston movement of the engine 102 may be performed using power of the electric motor 112 when the engine 102 is in a non-fuel injection and non-fuel ignition state. In this case, 'exhaust' in which outside air is sucked into an inside of the engine 102 and 'intake' in which inside air of the engine 102 is discharged to the outside are performed in the engine 102. That is, in a state in which fuel is not injected into a combustion chamber of the engine 102 and an ignition is not performed, the piston movement of the engine 102 is performed by the electric motor 112, thereby performing the suction and the discharge of the air in the engine 102.

The intake of the engine 102 is performed through an intake pipe 104, and the exhaust of the engine 102 is performed through an exhaust pipe 106.

In the exhaust pipe 106, a pressure switch 120 is provided near the engine 102, and an opening degree control valve 108 is provided away from the engine 102. The pressure switch 120 is a pressure adjusting device, and is provided to regulate an air pressure between the engine 102 and the opening degree control valve 108. The opening degree control valve 108 is provided such that a degree of opening thereof is regulated. As the degree of opening of the opening degree control valve 108 is increased, the exhaust of the engine 102 may be sufficiently performed. Conversely, when the exhaust of the engine 102 is performed in a state in which the degree of opening of the opening degree control valve 108 is 0 (zero), that is an end of the exhaust pipe 106 is completely closed by the opening degree control valve 108, air is compressed inside the exhaust pipe 106. In this case, the air is compressed without the combustion of the engine 102, and thus relatively clean air, which is sucked into the engine 102, becomes compressed air in the exhaust pipe 106 without changes.

In this state, a pressure of the compressed air inside the exhaust pipe 106 may be constantly maintained at a desired level through fine adjustment of the pressure switch 120. That is, when the pressure of the air inside the exhaust pipe 106 is higher than a target pressure, the pressure switch 120 is adjusted to reduce the pressure of the air inside the exhaust pipe 106 to the target pressure. Conversely, when the pressure of the air inside the exhaust pipe 106 is lower than the target pressure, the pressure switch 120 is adjusted to increase the pressure of the air inside the exhaust pipe 106 to the target pressure. In this case, an operation of increasing the power of the electric motor 112 to increase an amount of sucked air in the engine 102 may be accompanied.

'Target pressure' may be determined according to what blown high pressure air is used for. For example, if a user wants to use the blown high-pressure air for cleaning/care of the vehicle, the 'target pressure' at this time is a pressure that is sufficient to remove dust or foreign substances by blowing the dust or foreign substances for cleaning the vehicle, or a pressure that is sufficient to supplement the air pressure of the tire of the vehicle.

The engine 102 and the electric motor 112 are operated as a compressor to generate compressed air inside the exhaust pipe 106. A nozzle 130 that is a compressed air outlet is formed on a first side of the exhaust pipe 106. The nozzle 130 is used as a discharge portion for discharging the compressed air inside the exhaust pipe 106 to the outside. That is, the compressed air inside the exhaust pipe 106 may be discharged to the outside through the nozzle 130.

Figure 2:
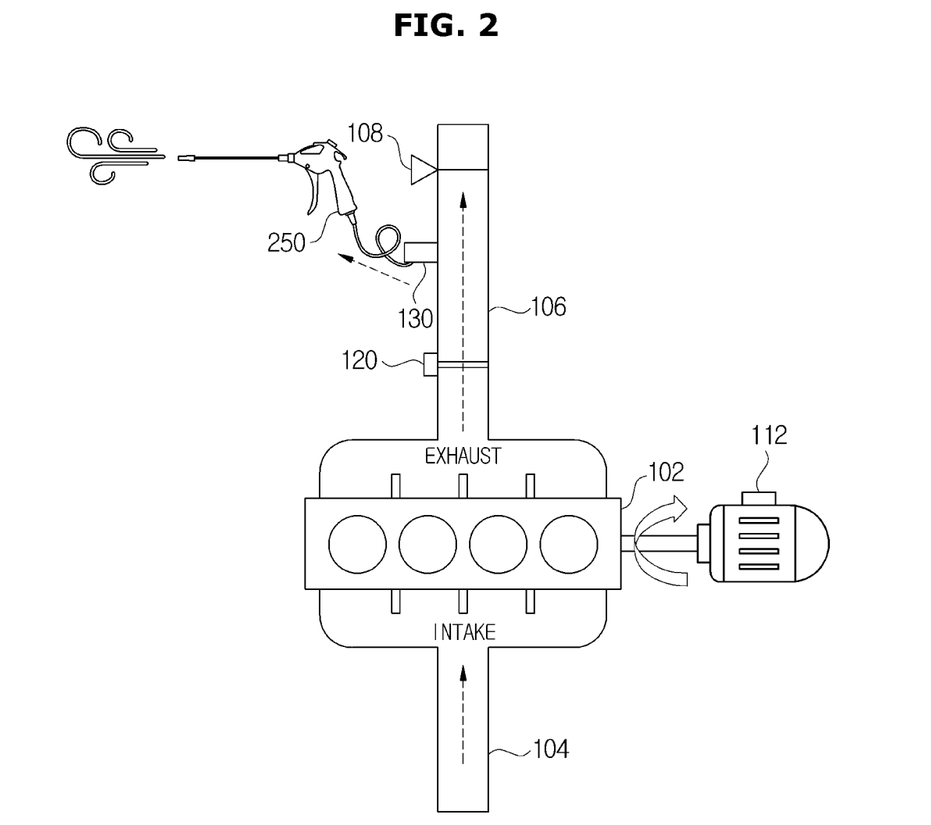
FIG. 2 is a view illustrating a state in which an air blow gun (or an air spray gun) is connected to the vehicle illustrated in FIG. 1.

FIG. 2 is a view illustrating a state in which an air blow gun (or an air spray gun) is connected to the vehicle illustrated in FIG. 1. An air blow gun (or air spray gun) 250 refers to a device that blows air with a relatively strong force.

In the description of FIG. 1 above, it is described that the engine 102 and the electric motor 112 are operated as a compressor to generate compressed air in the exhaust pipe 106, and the compressed air inside the exhaust pipe 106 is discharged to the outside through the nozzle 130.

As illustrated in FIG. 2, when the air blow gun 250 is connected to the nozzle 130 formed on the first side of the exhaust pipe 106, the compressed air inside the exhaust pipe 106 may be blown through the air blow gun 250. When the air, which is compressed inside the exhaust pipe 106 so to have a high pressure, is blown to the outside through the air blow gun 250, it is possible to remove dust on the vehicle by using strongly blown air.

Further, when a tip for injecting air to a tire is coupled to the air blow gun 250, air may be injected into the tire of the vehicle. That is, by injecting the compressed air inside the exhaust pipe 106 into the tire through the air blow gun 250, it is possible to increase an air pressure of the tire to a target level.

For this, specifications (outer diameter, inner diameter, etc.) of the nozzle 130 may be matched with standard specifications of the air blow gun 250 commercially available. In this case, a user of the vehicle can purchase the air blow gun 250 commercially available to connect the air blow gun 250 to the nozzle 130 according to an embodiment, and thus the user can use the air blow gun 250, which is generally readily available, for the cleaning/care of the vehicle.

In addition, when it is difficult to match the specifications (outer diameter, inner diameter, etc.) of the nozzle 130 with the standard specifications of the air blow gun 250 commercially available, the nozzle 130 may be formed in proprietary specifications, and the air blow gun 250 matched with the proprietary specifications of the nozzle 130 may be separately sold by the vehicle manufacturer or may be provided at the time of sale of the vehicle.

Figure 3:
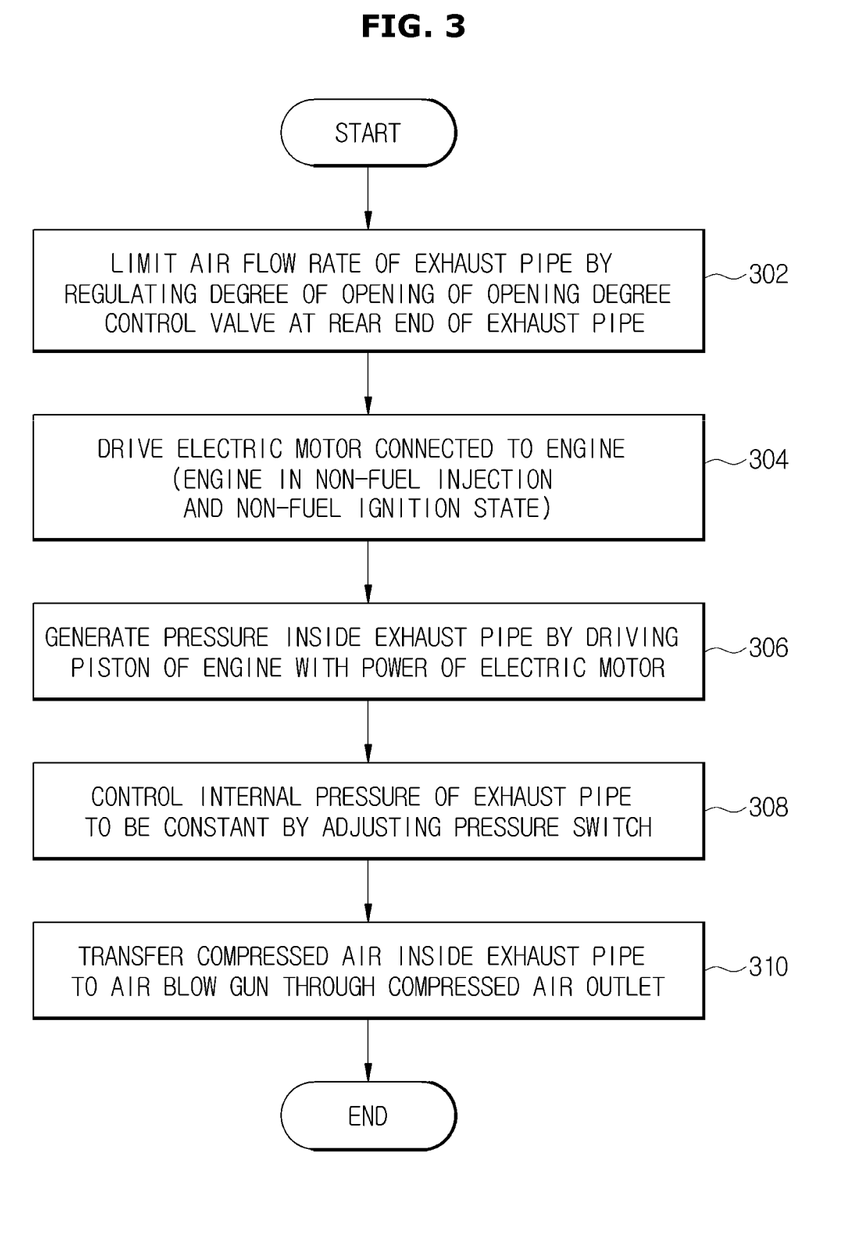
FIG. 3 is a flow chart illustrating a control method of the vehicle according to an embodiment of the disclosure.

FIG. 3 is a flow chart illustrating a control method of the vehicle according to an embodiment of the disclosure. The control method illustrated in FIG. 3 relates to a method for generating compressed air using the device configuration illustrated in FIGS. 1 and 2.

As illustrated in FIG. 3, an air flow rate of the exhaust pipe 106 is limited by regulating the degree of opening of the opening degree control valve 108 at the rear end of the exhaust pipe 106 (302). That is, in order to generate compressed air, the rear end of the exhaust pipe 106 is closed by setting the degree of opening of the opening degree control valve 108 to 0 (zero).

In a state in which the rear end of the exhaust pipe 106 is closed, the electric motor 112 connected to the engine 102 is driven (304). At this time, the engine 102 is in the non-fuel injection and non-fuel ignition state, that is in a state in which the engine 102 does not burn fuel.

Power generated by the driving of the electric motor 112 is transmitted to the engine 102 to drive the piston of the engine 102, thereby forming a pressure inside the exhaust pipe 106 (306). As the driving of the piston of the engine 102 using the power of the electric motor 112 continues, the pressure inside the exhaust pipe 106 further increases.

When the internal pressure of the exhaust pipe 106 increases to some extent, the internal pressure of the exhaust pipe 106 is controlled to be maintained at a target pressure by adjusting the pressure switch 120 (308). 'Target pressure' may be determined according to what blown high pressure air is used for. For example, if a user wants to use the blown high-pressure air for cleaning/care of the vehicle, the 'target pressure' at this time is a pressure that is sufficient to remove dust or foreign substances by blowing the dust or foreign substances for cleaning the vehicle, or a pressure that is sufficient to supplement the air pressure of the tire of the vehicle.

The compressed air inside the exhaust pipe 106 is transferred to the air blow gun 250 through the nozzle 130 (310). A user (driver) may perform cleaning/care of the vehicle using the high-pressure compressed air transferred to the air blow gun 250.

Figure 4:
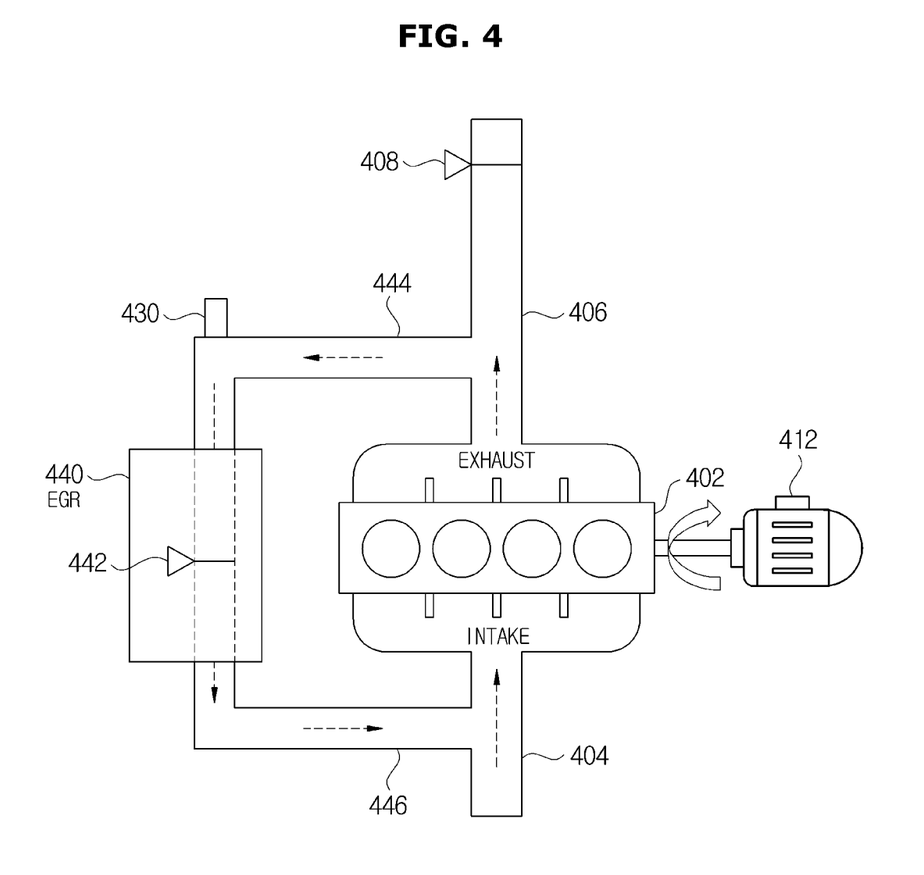
FIG. 4 is a view illustrating a vehicle according to another embodiment of the disclosure.

FIG. 4 is a view illustrating a vehicle according to another embodiment of the disclosure. Particularly, FIG. 4 is a view illustrating a vehicle in which an exhaust gas recirculation (EGR) device is provided in an engine 402. The vehicle of FIG. 4 is a hybrid electric vehicle (HEV) or a plug-in hybrid electric vehicle (PHEV) including the engine 402 and an electric motor 412. Accordingly, the vehicle of FIG. 4 may receive power from either the engine 402 and the electric motor 412, or both the engine 402 and the electric motor 412.

In FIG. 4, a piston movement of the engine 402 may be performed by power of the electric motor 412 when the engine 402 is in the non-fuel injection and non-fuel ignition state. In this case, 'exhaust' in which outside air is sucked into an inside of the engine 402 and 'intake' in which inside air of the engine 402 is discharged to the outside are performed in the engine 402. That is, in a state in which fuel is not injected into a combustion chamber of the engine 402 and an ignition is not performed, the piston movement of the engine 402 is performed by the electric motor 412, thereby performing the suction and the discharge of the air in the engine 402.

The intake of the engine 402 is performed through an intake pipe 404, and the exhaust of the engine 402 is performed through an exhaust pipe 406.

An exhaust gas recirculation (EGR) device 440 is provided between the exhaust valve 406 and the intake valve 404. The EGR device 440 is also called an exhaust gas reduction device. The EGR device 440 recirculates a portion of the exhaust gas burned in the engine 402 back to the engine 402 to reduce a temperature of the combustion chamber of the engine 402 to induce nitrogen oxide (NOx) suppression, thereby reducing the emission of exhaust gas and pollutants. That is, by recirculating the exhaust gas, it is possible to reduce the temperature of the combustion chamber and in this process, it is possible to reduce the emission of nitrogen oxide (NOx). The EGR device 440 is connected to the exhaust pipe 406 through an exhaust side connecting pipe 444, and is connected to the intake pipe 404 through an intake side connecting pipe 446. Accordingly, a circulation path is formed between the engine 402 and the EGR device 440. The EGR device 440 includes a recirculation control valve 442. The recirculation control valve 442 is configured to regulate an amount of circulated gas by adjusting a degree of opening thereof. Further, the recirculation control valve 442 may regulate an amount of air circulated through the circulation path by adjusting the degree of opening thereof and thus the recirculation control valve 442 may be operated as a pressure control device to regulate a pressure of internal air of the exhaust pipe 406 and the exhaust side connecting pipe 444.

In the exhaust pipe 406, an opening degree control valve 408 may be installed away from the engine 402. The opening degree control valve 408 is provided such that a degree of opening thereof is regulated. As the degree of opening of the opening degree control valve 408 is increased, the exhaust of the engine 402 may be sufficiently performed. Conversely, when the exhaust of the engine 402 is performed, in a state in which the degree of opening of the opening degree control valve 408 is 0 (zero), that is an end of the exhaust pipe 406 is completely closed by the opening degree control valve 408, air is compressed inside the exhaust side connecting pipe 444. In this case, the air is compressed without the combustion of the engine 402, and thus relatively clean air, which is sucked into the engine 402, becomes compressed air in the exhaust side connecting pipe 444 without changes.

In this state, a pressure of the compressed air inside the exhaust side connecting pipe 444 may be constantly maintained at a desired level through fine adjustment of the recirculation control valve 442 of the EGR device 440. That is, when the pressure of the air inside the exhaust side connecting pipe 444 is higher than a target pressure, the recirculation control valve 442 is adjusted to reduce the pressure of the exhaust side connecting pipe 444 to the target pressure. Conversely, when the pressure of the air inside the exhaust side connecting pipe 444 is lower than the target pressure, the recirculation control valve 442 is adjusted to increase the pressure of the air inside the exhaust side connecting pipe 444 to the target pressure. In this case, an operation of increasing the power of the electric motor 412 to increase an amount of sucked air in the engine 402 may be accompanied.

'Target pressure' may be determined according to what blown high pressure air is used for. For example, if a user wants to use the blown high-pressure air for cleaning/care of the vehicle, the 'target pressure' at this time is a pressure that is sufficient to remove dust or foreign substances by blowing the dust or foreign substances for cleaning the vehicle, or a pressure that is sufficient to supplement the air pressure of the tire of the vehicle.

The engine 402 and the electric motor 412 are operated as a compressor to generate compressed air inside the exhaust side connecting pipe 444. A nozzle 430 that is a compressed air outlet is formed on one side of the exhaust side connecting pipe 444. The nozzle 430 is used as a discharge portion for discharging the compressed air inside the exhaust side connecting pipe 444 to the outside. That is, the compressed air inside the exhaust pipe 406 may be discharged to the outside through the nozzle 430.

Figure 5:
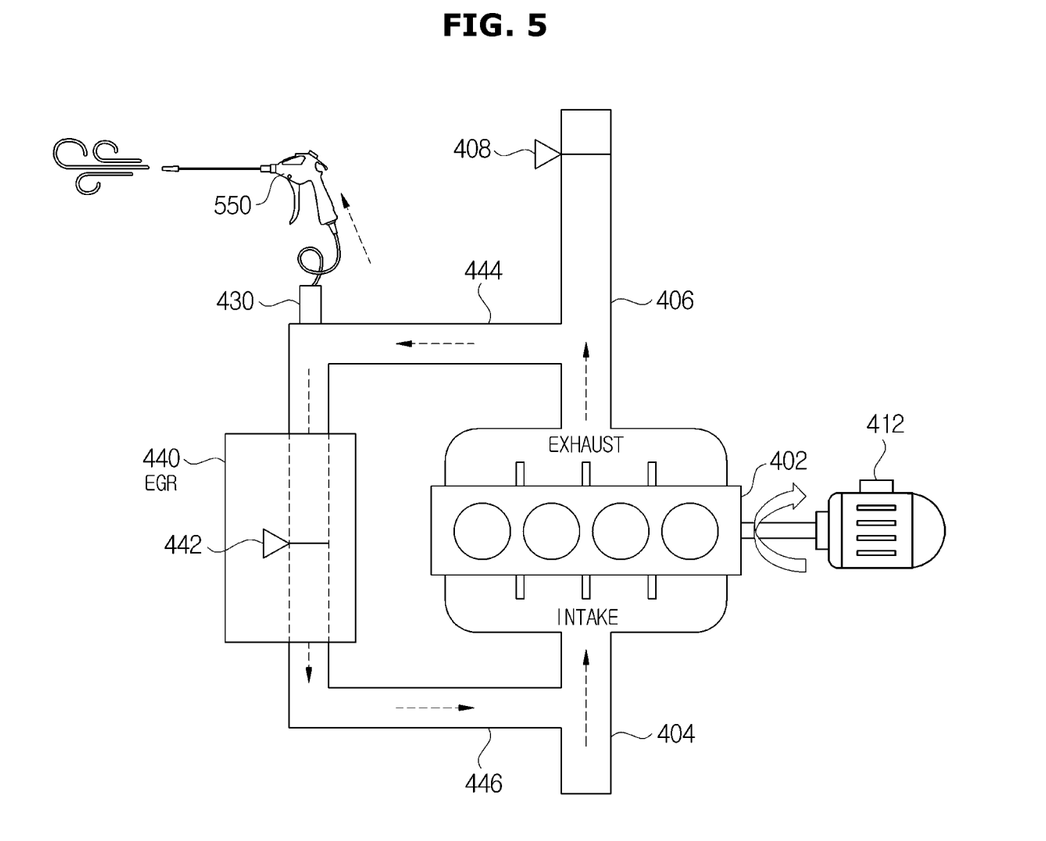
FIG. 5 is a view illustrating a state in which an air blow gun (or an air spray gun) is connected to the vehicle illustrated in FIG. 4.

FIG. 5 is a view illustrating a state in which an air blow gun (or an air spray gun) is connected to the vehicle illustrated in FIG. 4. An air blow gun (or air spray gun) 550 refers to a device that blows air with a relatively strong force.

In the description of FIG. 4 above, it is described that the engine 402 and the electric motor 412 are operated as a compressor to generate compressed air in the exhaust side connecting pipe 444, and the compressed air inside the exhaust side connecting pipe 444 is discharged to the outside through the nozzle 430.

As illustrated in FIG. 5, when the air blow gun 550 is connected to the nozzle 430 formed on one side of the exhaust side connecting pipe 444, the compressed air inside the exhaust side connecting pipe 444 may be blown through the air blow gun 550. When the air, which is compressed inside the exhaust side connecting pipe 444 so to have a high pressure, is blown to the outside through the air blow gun 550, it is possible to remove dust on the vehicle by using strongly blown air.

Further, when a tip for injecting air to a tire is coupled to the air blow gun 550, air may be injected into the tire of the vehicle. That is, by injecting the compressed air inside the exhaust side connecting pipe 444 into the tire through the air blow gun 550, it is possible to increase an air pressure of the tire to a target level.

For this, specifications (outer diameter, inner diameter, etc.) of the nozzle 430 may be matched with standard specifications of the air blow gun 550 commercially available. In this case, a user of the vehicle can purchase the air blow gun 550 commercially available to connect the air blow gun 550 to the nozzle 430 according to an embodiment, and thus the user can use the air blow gun 550, which is generally readily available, for the cleaning/care of the vehicle.

In addition, when it is difficult to match the specifications (outer diameter, inner diameter, etc.) of the nozzle 430 with the standard specifications of the air blow gun 550 commercially available, the nozzle 430 may be formed in proprietary specifications, and the air blow gun 550 matched with the proprietary specifications of the nozzle 430 may be separately sold by the vehicle manufacturer or may be provided at the time of sale of the vehicle.

Figure 6:
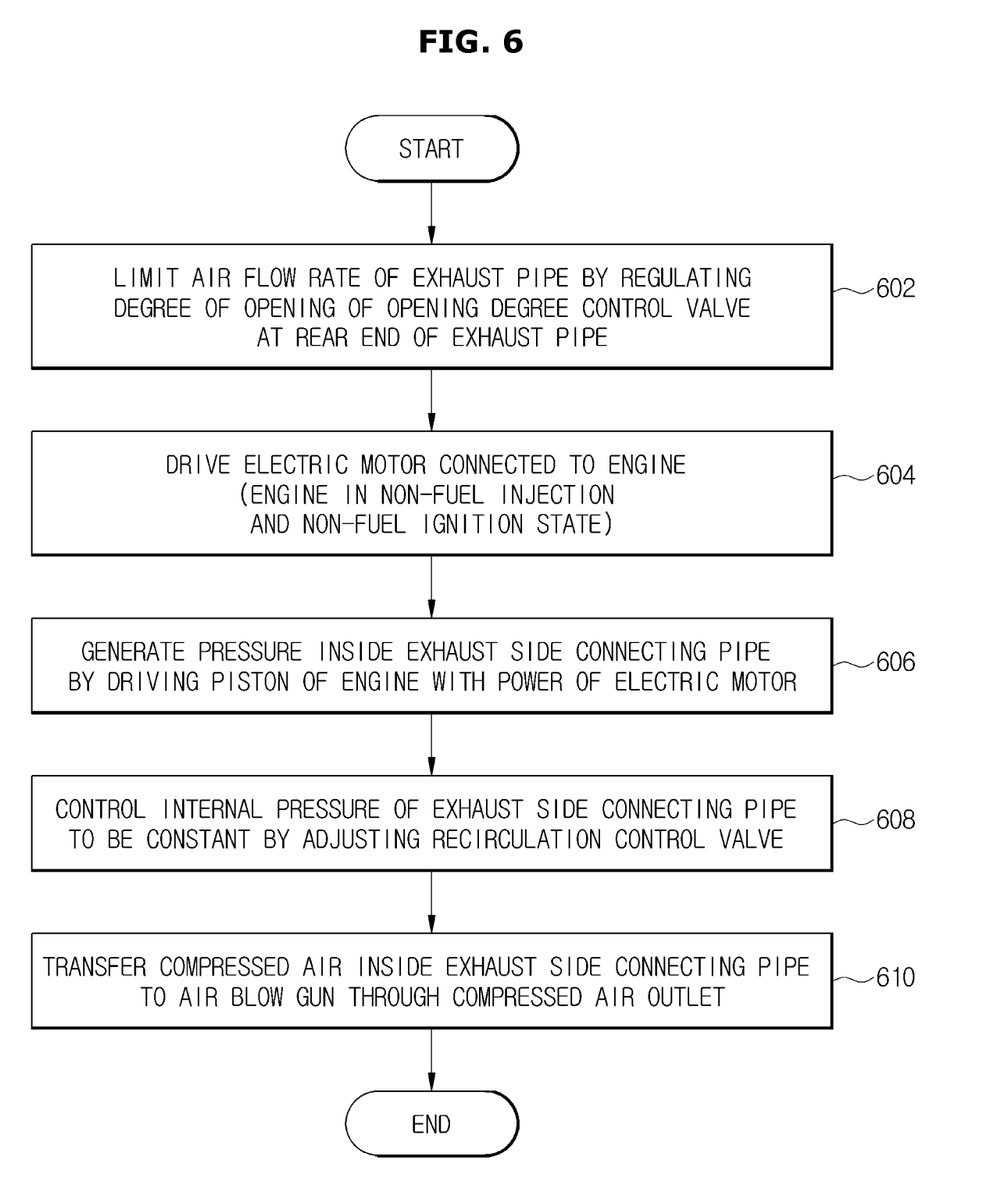
FIG. 6 is a flow chart illustrating a control method of the vehicle according to another embodiment of the disclosure.

FIG. 6 is a flow chart illustrating a control method of the vehicle according to another embodiment of the disclosure. The control method illustrated in FIG. 6 relates to a method for generating compressed air using the device configuration illustrated in FIGS. 4 and 5.

As illustrated in FIG. 6, an air flow rate of the exhaust pipe 406 is limited by regulating the degree of opening of the opening degree control valve 408 at the rear end of the exhaust pipe 406 (602). That is, the rear end of the exhaust pipe 406 is closed by setting the degree of opening of the opening degree control valve 408 to 0 (zero) in order to generate compressed air.

In a state in which the rear end of the exhaust pipe 406 is closed, the electric motor 412 connected to the engine 402 is driven (604). At this time, the engine 402 is in the non-fuel injection and non-fuel ignition state, that is in a state in which the engine 402 does not burn fuel.

Power generated by the driving of the electric motor 412 is transmitted to the engine 402 to drive the piston of the engine 402, thereby forming a pressure inside the exhaust pipe 406 (606). As the driving of the piston of the engine 402 using the power of the electric motor 412 continues, the pressure inside the exhaust pipe 406 further increases. Accordingly, the pressure inside the exhaust side connecting pipe 444 also increases.

When the internal pressure of the exhaust pipe 406 increases to some extent, the internal pressure of the exhaust side connecting pipe 444 is controlled to be maintained at a target pressure by adjusting the recirculation control valve 442 of the EGR device 440 (608). 'Target pressure' may be determined according to what blown high pressure air is used for. For example, if a user wants to use the blown high-pressure air for cleaning/care of the vehicle, the 'target pressure' at this time is a pressure that is sufficient to remove dust or foreign substances by blowing the dust or foreign substances for cleaning the vehicle, or a pressure that is sufficient to supplement the air pressure of the tire of the vehicle.

The compressed air inside the exhaust side connecting pipe 444 is transferred to the air blow gun 550 through the nozzle 430 (610). A user (driver) may perform cleaning/care of the vehicle using high-pressure compressed air transferred to the air blow gun 550.

As is apparent from the above description, it is possible to generate compressed air using a motor of a vehicle, such as a hybrid electrical vehicle (HEV) or a plug-in hybrid electrical vehicle (PHEV), so as to perform cleaning/care of the vehicle, without an additional device, and thus it is possible to increase user convenience and reduce cost.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
an engine comprising an intake pipe provided to suck outside air and an exhaust pipe provided to discharge inside air;
an opening degree control valve provided at a rear end of the exhaust pipe, and
a motor configured to generate power for driving a wheel and configured to drive a piston of the engine by using a portion of the power,
wherein in response to the opening degree control valve being in a closed state, and in response to the engine being in a non-combustion state, compressed air is generated in the exhaust pipe by driving the piston of the engine with the power of the motor.

2. The vehicle of claim 1, further comprising:
a compressed air outlet provided on a first side of the exhaust pipe and through which internal air of the exhaust pipe is discharged to an outside.

3. The vehicle of claim 2, further comprising:
a pressure adjusting device provided on a second side of the exhaust pipe to adjust an internal pressure of the exhaust pipe.

4. The vehicle of claim 2, wherein:
the compressed air outlet is configured to allow an air blow gun to be connected thereto.

5. The vehicle of claim 1, further comprising:
an exhaust gas recirculation (EGR) device provided between the exhaust pipe and the intake pipe;
an exhaust side connecting pipe provided to connect the EGR device to the exhaust pipe; and
a compressed air outlet provided on a first side of the exhaust side connecting pipe and through which internal air of the exhaust pipe is discharged to an outside.

6. The vehicle of claim 5, wherein:
the EGR device comprises a recirculation control valve, and
a pressure of the internal air of the exhaust pipe is regulated through the recirculation control valve.

7. The vehicle of claim 5, wherein:
the compressed air outlet is configured to allow an air blow gun to be connected thereto.

8. A control method of a vehicle comprising an engine comprising an intake pipe provided to suck outside air and an exhaust pipe provided to discharge inside air; an opening degree control valve provided at a rear end of the exhaust pipe; and a motor configured to generate power for driving a wheel and configured to drive a piston of the engine by using a portion of the power, the control method comprising:
in response to the opening degree control valve being in a closed state, and in response to the engine being in a non-combustion state, generating compressed air in the exhaust pipe by driving the piston of the engine with the power of the motor.

9. The control method of claim 8, further comprising:
a compressed air outlet provided on a first side of the exhaust pipe and through which internal air of the exhaust pipe is discharged to an outside.

10. The control method of claim 9, further comprising:
a pressure adjusting device provided on a second side of the exhaust pipe to adjust an internal pressure of the exhaust pipe.

11. The control method of claim 9, wherein the compressed air outlet is configured to allow an air blow gun to be connected thereto.

12. The control method of claim 8, further comprising:
an exhaust gas recirculation (EGR) device provided between the exhaust pipe and the intake pipe;
an exhaust side connecting pipe provided to connect the EGR device to the exhaust pipe; and
a compressed air outlet provided on one side of the exhaust side connecting pipe and through which internal air of the exhaust pipe is discharged to an outside.

13. The control method of claim 12, wherein:
the EGR device comprises a recirculation control valve, and
a pressure of the internal air of the exhaust pipe is regulated through the recirculation control valve.

14. The control method of claim 12, wherein the compressed air outlet is configured to allow an air blow gun to be connected thereto.

* * * * *